United States Patent
Kushner et al.

(10) Patent No.: US 11,561,804 B1
(45) Date of Patent: Jan. 24, 2023

(54) VIRTUAL ASSISTANT TRANSFER PROTOCOL

(71) Applicant: Wells Fargo Bank, N.A., San Francisco, CA (US)

(72) Inventors: Kristine Ing Kushner, Orinda, CA (US); John T. Wright, Benicia, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/450,352

(22) Filed: Oct. 8, 2021

Related U.S. Application Data

(63) Continuation of application No. 16/721,855, filed on Dec. 19, 2019, now Pat. No. 11,144,331.

(51) Int. Cl.
*G06F 8/60* (2018.01)
*G06F 9/445* (2018.01)

(52) U.S. Cl.
CPC .............. *G06F 9/4451* (2013.01); *G06F 8/60* (2013.01)

(58) Field of Classification Search
CPC ....................................................... G06F 8/60
See application file for complete search history.

(56) References Cited

U.S. PATENT DOCUMENTS

| | | | |
|---|---|---|---|
| 6,763,226 B1 * | 7/2004 | McZeal, Jr. | H04M 1/7243 455/575.1 |
| 8,275,351 B1 | 9/2012 | Cazanas et al. | |
| 8,572,171 B1 | 10/2013 | Greenspan et al. | |
| 8,818,926 B2 | 8/2014 | Wallace | |
| 9,413,868 B2 | 8/2016 | Cronin | |
| 9,462,112 B2 | 10/2016 | Woolsey et al. | |
| 9,635,176 B2 | 4/2017 | Griesmer et al. | |
| 9,794,199 B2 | 10/2017 | Capper et al. | |
| 9,847,084 B2 | 12/2017 | Gustafson et al. | |
| 10,789,040 B1 | 9/2020 | Silvester et al. | |
| 2014/0279050 A1 | 9/2014 | Makar et al. | |
| 2015/0186156 A1 * | 7/2015 | Brown | H04L 51/02 715/706 |
| 2017/0178626 A1 | 6/2017 | Gruber et al. | |
| 2017/0180499 A1 | 6/2017 | Gelfenbeyn et al. | |
| 2017/0353404 A1 | 12/2017 | Hodge | |
| 2018/0108353 A1 | 4/2018 | Gustafson et al. | |
| 2018/0293483 A1 | 10/2018 | Abramson et al. | |
| 2020/0076947 A1 * | 3/2020 | Deole | H04M 3/527 |

OTHER PUBLICATIONS

"U.S. Appl. No. 16/721,855, Notice of Allowance dated Jun. 11, 2021".

* cited by examiner

*Primary Examiner* — Jae U Jeon
(74) *Attorney, Agent, or Firm* — Schwegman Lundberg & Woessner, P.A.

(57) ABSTRACT

A method may include receiving a request to transfer a personal virtual assistant to a computing device, the personal virtual assistant including response preferences of a user; accessing a virtual assistant transfer protocol associated with the user; the virtual assistant transfer protocol including a sensitivity preference; applying the sensitivity preference to data associated with the personal virtual assistant to generate a virtual assistant transfer package; and transmitting the virtual assistant transfer package to the computing device.

20 Claims, 5 Drawing Sheets

VIRTUAL ASSISTANT TRANSFER PROTOCOL

CROSS-REFERENCE TO RELATED APPLICATION

This application is a continuation of U.S. patent application Ser. No. 16/721,855, filed Dec. 19, 2019, now issued as U.S. Pat. No. 11,144,331, which is incorporated by reference herein in its entirety.

TECHNICAL FIELD

Embodiments described herein generally relate to virtual assistants and in particular, but without limitation to, transferring virtual assistants between different computing devices.

BACKGROUND

Chatbots and virtual assistants (collectively virtual assistants) may be used by entities (e.g., companies, websites) or users in a variety of situations. For example, a user may converse with a virtual assistant to tell the virtual assistant to turn on music, order a product, etc. The user may interact with a virtual assistant via a window on a webpage to help resolve a problem with their account, etc.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
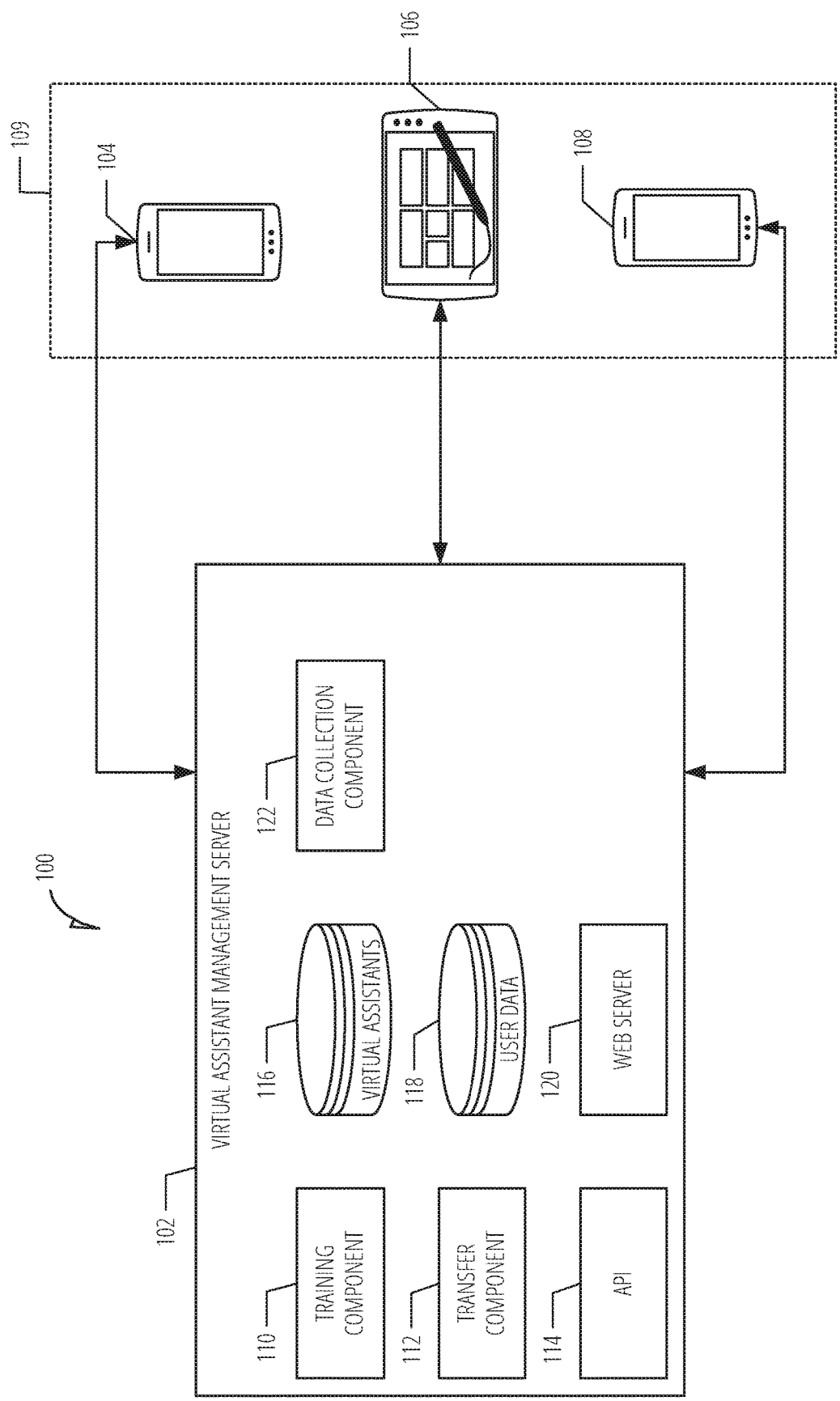
FIG. 1 is a diagram illustrating an overview of a system for a virtual assistant transfer, according to various examples.

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device accessible by the component via an Application Programming Interface (API) or other program communication method. Similarly, the variables may be assumed to have default values should a specific value not be described. User interfaces may be provided for an end-user or administrator to edit the variable values in various examples.

Virtual assistants (e.g., SIRI® by APPLE®, ALEXA® by AMAZON®, etc.) exist in a variety of forms. For example, a virtual assistant may be designed to be part of a mobile device's operating system (OS), may be installed as an application on a user's computing device, or may operate a webpage, Virtual assistants may be used for a variety of purposes. For example, a virtual assistant may be used to answer questions, schedule reminders, etc. A user may interact with a virtual assistant via voice or text. Virtual assistants may also interact with either other people or virtual assistants on behalf of the user. Generally, a virtual assistant has more features and language processing ability than a chatbot the latter of which is typically hardcoded and lack sophisticated learning capabilities. In this disclosure, however, the term virtual assistant may be considered to cover chatbots as well.

Virtual assistants may classify a statement inputted (e.g., via an audio or graphical interface) to determine the statement's intent and provide a response based on the intent. The precise classifier used in a virtual assistant may not affect the described methods and systems in disclosure; however, some of the more common types of classifiers include pattern matching (e.g., brute force), algorithms (e.g., Multinomial Naive Bayes), or neural networks.

No matter the classifier, the virtual assistant is generally only as good as its training set. For example, a virtual assistant that has been trained by looking at chat transcripts of one user would likely behave very differently than if trained on the chat transcripts of a second user.

One problem with virtual assistants—especially ones that have been personalized according to user data is the non-portable nature of the virtual assistant. For example, based on the actions of a user over a period of time a virtual assistant (e.g., one offered by a company) will inherently behave differently than the same virtual assistant that has not observed/trained those actions. The virtual assistant may have learned implicit or explicit preferences of the user such what sentiment to use when interacting with other users or virtual assistant, times of day when the user like to make dinner reservations, when the user may respond to questions from the virtual assistant, preferred addresses of the user, etc.

Simply downloading the virtual assistant from the same company that offers the virtual assistant on a new device will not mean the downloaded virtual assistant will behave as the user expects. Even if the virtual assistant is already installed on the new device it may not have access to the personalized version of the virtual assistant on the previous device due to data privacy restrictions. Without having learned about the user, all the preferences will be lost. This may result in the virtual assistant behaving in a manner that the user does not expect which require intervention/retraining by the user, etc.

FIG. 1 is a diagram 100 illustrating an overview of a system for a virtual assistant transfer, according to various examples. Diagram 100 includes virtual assistant management server (VAMS) 102, mobile device 104, tablet device 106, and mobile device 108 (collectively client devices 109). VAMS 102 includes training component 110, transfer component 112, application programming interface (API) 114, virtual assistants 116, user data 118, web server 120, and data collection component 122.

For illustration purposes, VAMS 102 is illustrated as set of separate functional units (e.g., training component 110, transfer component 112, API 114, web server 120, and data collection component 122.). However, the functionality of multiple functional units may be performed by a single unit. A functional unit may represent computer program code that is executable by a processing unit (e.g., a core of a general-purpose computer processor, a graphical processing unit, an application specific integrated circuit, etc.). The program code may be stored on a storage device and loaded into a memory of the processing unit for execution. Portions of the program code may be executed in a parallel across multiple processing units. Execution of the code may be performed on a single device or distributed across multiple devices. In some example, the program code is executed on a cloud platform (e.g., MICROSOFT AZURE® and AMAZON EC2®) using shared computing infrastructure.

In various examples, VAMS 102, mobile device 104, tablet device 106, and mobile device 108 may communicate via one or more networks (not illustrated). A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. A network may include a single local area network (LAN) or wide-area network (WAN), or combinations of LAN's or WANs, such as the Internet.

Training component 110 may include logic for training or programming one or more of virtual assistants 116. Different virtual assistants may be trained in different ways. Data within virtual assistants 116 may identify what training method to use for a particular virtual assistant and what data sets. For example, one virtual assistant may use a neural network that takes previous chat sessions of a user as input. Another virtual assistant may be trained based using a Naïve Bayes classifier to detect sentiment of a user based on customer service chat logs.

Different methods of training or programming a virtual assistant without departing from the scope of this disclosure.

In addition to automatic training, a virtual assistant may be personalized, and thus trained, by a user. For example, as discussed above; one common use case for virtual assistants is to have them perform tasks for a user, which may include the virtual assistant interacting with other virtual assistants (or users) on behalf of the user. It is not uncommon for the virtual assistant to either make errors or decisions that the user would prefer the virtual assistant not make. Conversations between the virtual assistant and the other users or virtual assistant may be replayed (e.g., viewed) by the user and corrected. For example, the replay may include a display of options that were presented to a virtual assistant and the selection made by the virtual assistant. The user may select a different option thereby indicating the selected response was wrong. In other examples, an input box may be presented with how the user wanted the virtual assistant to respond to a question, etc. Thus, the corrected replay becomes data that is used to further train the virtual assistant.

Virtual assistants 116 may store data related to a set of virtual assistants managed by VAMS 102. In various examples, virtual assistants 116 may not store the actual virtual assistant, but instead data (or references to the data) associated with the virtual assistant to facilitate transfer of the virtual assistant. In other examples, a copy of virtual assistant itself may be stored. Further discussion of virtual assistants 116 is provided in the context of FIG. 3.

User data 118 may store data associated with user profiles of users of VAMS 102. User data 118 may identify virtual assistants of the users and data associated with those virtual assistants. Data collection component 122 may include logic for collecting data used with virtual assistants 116 as well as data provided by the user for training (e.g., the corrected replays discussed above). Further discussion of user data 118 and data collection component 122 is provided in the context of FIG. 2.

Data used in the VAMS 102 (e.g., virtual assistants 116 and user data 118) may be organized and stored in a variety of manners. For example, the data is often may be stored in a database(s) with tables. The specific storage layout and model used in a database may take a number of forms indeed, a database may utilize multiple models. The database may be, but is not limited to, a relational database (e.g., SQL), non-relational database (NoSQL) a flat file database, object model, document details model, graph database, shared ledger (e.g., blockchain), or a file system hierarchy. The database may store data on one or more storage devices (e.g., a hard disk, random access memory (RAM), etc.). The storage devices may be in standalone arrays, part of one or more servers, and may be located in one or more geographic areas Web server 120 may be used to exchange information with users via a network such as the Internet. Although generally discussed in the context of delivering webpages via the Hypertext Transfer Protocol (HTTP), other network protocols may be utilized by web servers 110 (e.g., e Transfer Protocol, Telnet, Secure Shell, etc.) A user may enter in a uniform resource identifier (URI) into a network browser (e.g., the INTERNET EXPLORER® web browser by Microsoft Corporation or SAFARI® web browser by Apple Inc.) that corresponds to the logical location (e.g., an Internet Protocol address) of one or more web applications/pages served by web server 120. In response, web server 120 may transmit a web page that is rendered on a display device of one or client devices 109. In various examples, web server 120 provides a web application that includes options for a user to transfer their virtual assistant from one device to another.

An API provides a method for computing processes to exchange data. A web-based API may permit communications between two or more computing devices such as a client and a server. The API may define a set of HTTP calls according to Representational State Transfer (RESTful) practices. For examples, A RESTful API may define various GET, PUT, POST, DELETE methods to create, replace, update, and delete data stored on in a database on the server.

For example, API 114 may be used to delete virtual assistants, add virtual assistants, train virtual assistants, or transfer virtual assistants. Depending on the API call, API 114 may invoke one or more of training component 110, transfer component 112, and data collection component 122 in various examples. API 114 may also be used to communicate with the virtual assistant themselves. For example, API 114 may be used issue commands to a virtual assistant or for the virtual assistant to send data to VAMS 102, for the virtual assistant to cease an active conversation, delete itself from a mobile device, etc.

Transfer component 112 may include logic for transferring a virtual assistant from one user device to another. For example, a user may purchase a new phone (e.g., mobile device 108) and want to transfer their virtual assistant from mobile device 104 to mobile device 108. Transfer component 112 may update user data 118 after a success transfer to indicate that the virtual assistant is now associated with mobile device 108. Transfer component 112 may invoke a transfer protocol that examines a number of factors of whether a virtual assistant may be transferred and how it is it transferred.

For example, one factor may be a computationally complexity rating for a virtual assistant with respect to training or using the virtual assistant. If a user is attempting to transfer a virtual assistant to a device with less computational capability (e.g., based on a benchmark score, clock speeds, installed RAM, etc.), a warning may be presented that the virtual assistant may not perform as well on the new device or that the virtual assistant may not be able to be used on the new device.

In addition to the warning, a pruned variant of the virtual assistant, optimized for the computational power of the recipient device, may be offered as an option to the user. The pruned variant may include a smaller amount of training data, use fewer nodes in a neural network layer, fewer layers, etc. Furthermore, the virtual assistant in the new environment may retain, but not use, information (data types, sources, model weightings) from the more complex environment that can be a helpful guide to re-estimation when the assistant is ported back to a more complex environment.

Prescreened prescriptions around what may be retained in a file accompanying the virtual assistant about sensitive elements may be in place, so that information that cannot be ported may be described for future use to the extent that compliance allows. For example, the virtual assistant may not be able to port account activity information, but the user may wish to have the benefits that the virtual assistant may provide if it had that information. So, the user may be able to arrange for that information to be available in the new environment (e.g., at the new computing device)

Another factor may be the sensitivity preference of data that has been used to train the virtual assistant. For example, consider that a virtual assistant has been interacting with a financial institution and therefore chatlogs may include balance information, account numbers, etc. In many instances, this is not data that a user wants to have transferred without at least being modified to exclude the account numbers, personally identifiable information, etc. Accordingly, the sensitivity preference may indicate that all potentially sensitive information is removed from any training data source. The sensitive data may be identified using pattern matching or other techniques as known in the art without departing from the scope of this disclosure. In other instances, the sensitive data may be encrypted.

Similarly, there may be some training data that is not portable at all either because of a user request or the originating data source. In such instance, that training data may be blocked from being transferred. After determining which data may need to be blocked or modified, a warning may be presented to the user indicating that not all of the training data may be used by the virtual assistant after the transfer.

Alternately, a user or administrator may specify elements or features that should be prioritized when porting (e.g., transferring). This could be a directive "do not port if this element or feature is not included." Or it could take the form of a ranking so that if pruning is necessary, there is a prioritized list. The specification could be prescriptive in the sense that data elements or features are directly specified, or could be outcomes, such that the virtual assistant is re-estimated prior to porting.

The user or the administrator may also specify, if there is a virtual assistant in place on the recipient device, whether that virtual assistant should be overwritten/replaced, or merged with the new assistant. The merge may take the form of re-estimation (e.g., training) using a combination of prioritized factors or weightings from the former assistant, with overwriting or completely new factors or weightings from the new assistant.

The virtual assistant may maintain or create two variants with porting in mind, such that one variant may have more modeling power and accuracy in a particular environment, but the other may be optimized for porting such that it includes all prescribed elements and excludes all elements that cannot be ported due to computational complexity or content sensitivity.

The transfer protocol may also determine if the virtual assistant is currently in a conversation (e.g., by transmitting a request to the virtual assistant via an API). If a conversation is currently taking place, the transfer protocol may include a command to tell the virtual assistant to cease the conversation.

Figure 2:
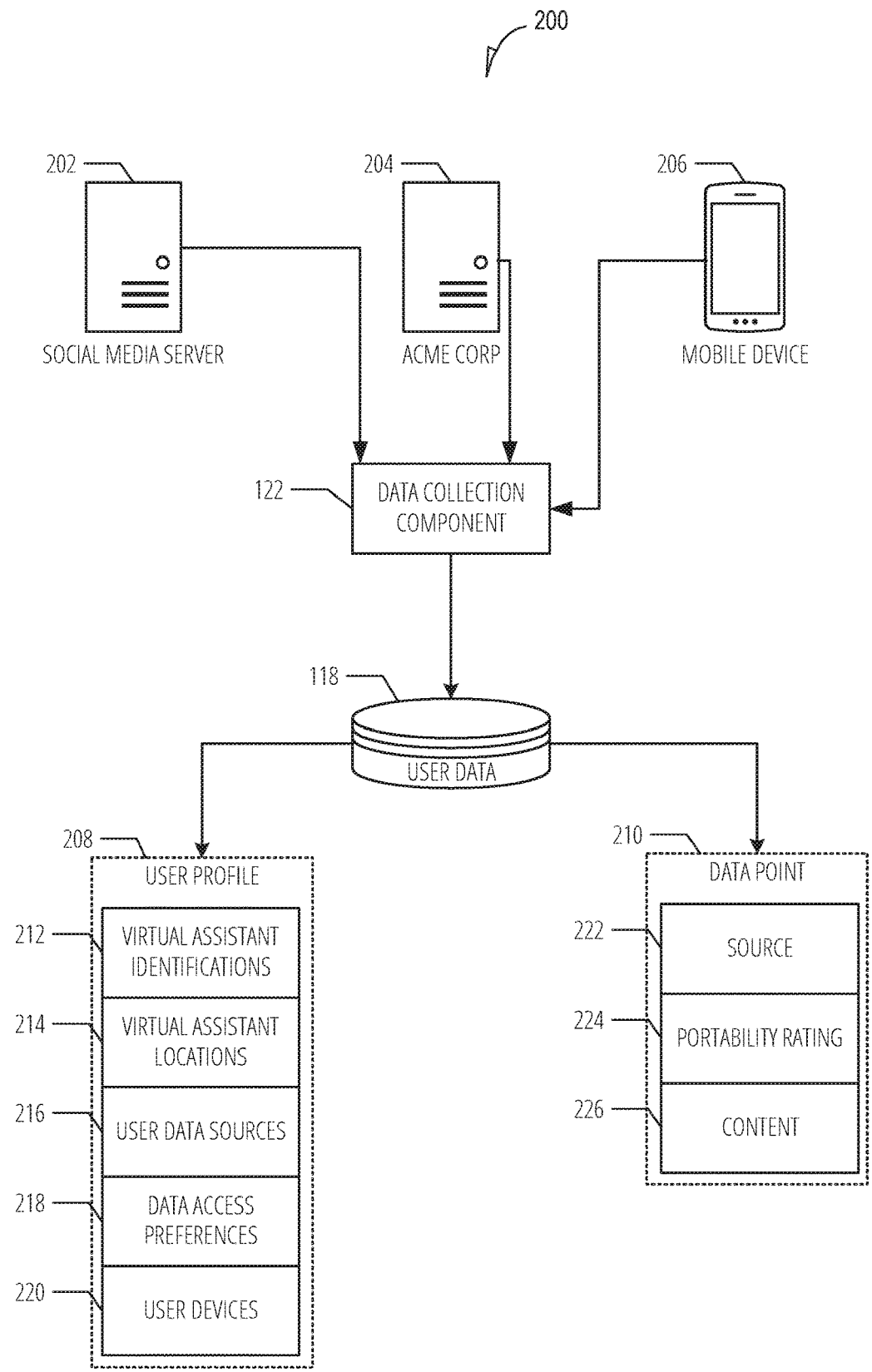
FIG. 2 is a diagram illustrating components for collection of user data, according to various examples.

FIG. 2 is a diagram 200 illustrating components for collection of user data, according to various examples. Diagram 200 includes data collection component 122, user data 118, social media server 202, ACME Corp 204, mobile device 206, user profile 208, and data point 210. User profile 208 is illustrated as including virtual assistant identifications 212, virtual assistant locations 214, user data sources 216, data access preferences 218, and user device 220. Data point 210 is illustrated as including source 222, portability rating 224, and content 226.

Data collection component 122 may collect data from data sources such as social media server 202, ACME Corp 204, and mobile device 206 for use in training a virtual assistant for a user. The data may be in a variety of forms including, hut not limited to, chat messages with human users, chat messages with virtual assistants, corrected chat message, video data, social media posts, location data, gaming data, etc. Because of the potentially sensitive nature of the data, the user may be periodically reminded about the data collection and have the opportunity to delete existing data or cease further data collection.

User profile 208 may store data associated with virtual assistants of the user. A user may log in to VAMS 102 (e.g., using a username/password) to view and edit data stored in user profile 208. For example, web server 120 may transmit a web page with user interface elements that may be clicked to modify/add/delete virtual assistants associated with the user, edit access rights to data, and modify/add/delete user devices associated with the user profile 208.

Virtual assistant identifications 212 may present identifications of virtual assistants that are associated with user profile 208. As discussed further in FIG. 3, each virtual assistant may have an identifier (e.g., a number, token, etc.) The identification may be stored as associated with a username in user data 118. Accordingly, when a user logs into VAMS 102, each virtual assistant associated with the user may be retrieved.

Virtual assistant locations 214 may store the identification of the current user device(s) associated with a virtual assistant. For example, a virtual assistant may be associated with mobile device 104 or tablet device 106. In various examples, a user interface element is presented next to the current location of a virtual assistant and an option to transfer the virtual assistant to another device. Upon activation, transfer component 112 may be invoked as discussed previously in which a new device may be selected. After a success transfer, virtual assistant locations 214 may be updated to the new device.

User data sources 216 may identify the data sources a user has granted access to, for data collection, as managed by data access preferences 218. When authentication is required for a data source, a user may enter in their credentials for the data source. A data source may be a website, a device, an application, among others. A user may delete a data source by clicking a button next to an identification of the data source in various examples. A data source may be added using a drop-down menu (e.g., a list of social media sites, websites, etc.).

Data access preferences 218 may manage the access rights to data collected by data collection component 122 from the data sources. For example, different levels of access may be granted to different data types. A user may only allow access to the most recent month of social media posts or the most recent six months of chat logs.

User devices 220 may identify devices associated with a user. Identifications may vary depending on the type of device. For example, a mobile device may be identified by an International Mobile Station Equipment Identity (IMEI) or Mobile Equipment Identifier (MEM). A personal computer may be identified by its serial number. In various examples, an application associated with VAMS 102 may be installed on a user device to obtain the identification and transmit it to VAJVIS 102. User devices 220 may also be organized in groups in various examples (e.g., "private", "public").

Data point 210 may a set of data collected from a data source identified in user data sources 216. The set of data may be, for example, a chat session that was conducted by a virtual assistant in which the user corrected the virtual assistant.

A data point may include a source 222, have a portability rating 224, and the content 226. An identifier in source 222 may correspond to an identifier of a data source in user data sources 216, in various examples. Content 226 may be the content itself or a location (e.g., a logical location such as an IP address, database, etc.). of the content.

Portability rating 224 may be a numerical (e.g., 1-5) or binary rating indicating whether or not data point 210 may be transferrable or accessible from another device should a virtual assistant be transferred. Portability rating 224 may depend on a number of factors including, but not limited, the data source, the content itself, the size of the content, the type of the content, the sensitivity preference with respect to of the content. With respect to sensitivity, for example, some data may include personally identifiable information (PII) such as addresses, social security numbers, etc. If data point 210 is determined to include PH via pattern matching or other techniques known in the art the portability rating may be 0. The transfer protocol, as described with respect to transfer component 112, may only transfer data that has a portability rating above a certain threshold, in various examples.

Different rules may be established and evaluated by data collection component 122 to calculate portability rating 224. For example, each possible factor may be given a weight (e.g., (0.2*type score)+(0.5*PII score), etc.). Each factor may have its own rules in determining the component score (e.g., size>100 Kb is 3, size between 100 KB and 1 MB is 4). In some instances, there may be a rule that overrides the weighted score. For example, some data sources may not permit transferring of data in which case the portability score may be 0 for data from those sources.

Figure 3:
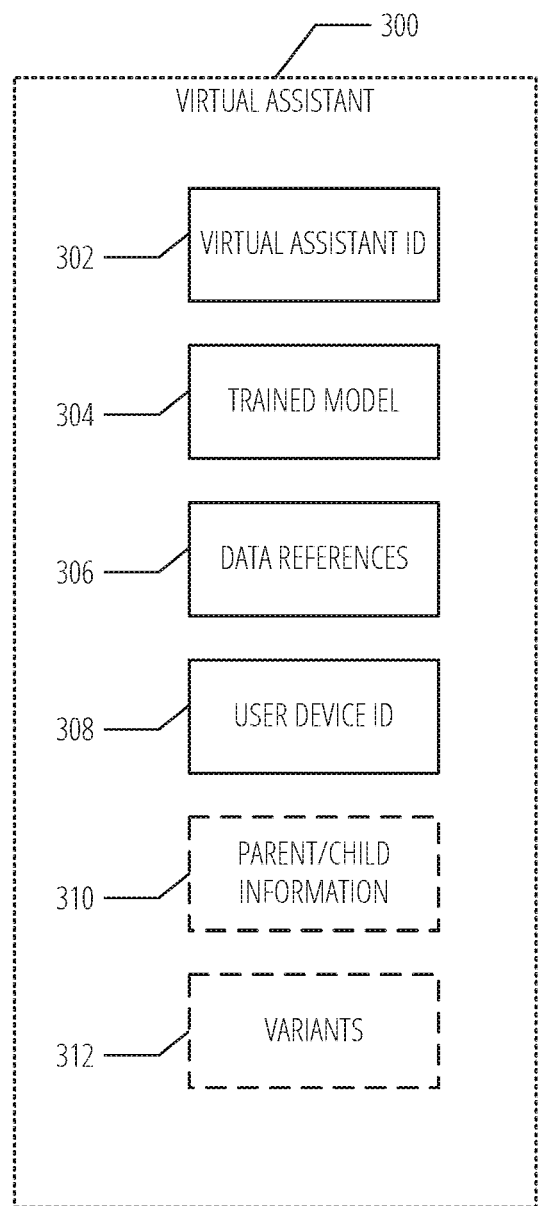
FIG. 3 is a diagram illustrating components of a virtual assistant, according to various examples.

FIG. 3 is a diagram illustrating components of a virtual assistant 300, according to various examples. Virtual assistant 300 is illustrated as including virtual assistant ID 302, trained model 304, data references 306, user device ID 308, parent/child information, and variants 312.

Virtual assistant ID 302 may be an identification (e.g., a number) of the virtual assistant. Virtual assistant ID 302 may be used by virtual assistant identifications 212 when associating a virtual assistant with a user. In various examples, a virtual assistant may communicate its ID directly with VAMS 102 when installed.

Trained model 304 may include weights of a neural network for a virtual assistant, underlying data that describes how to train the virtual assistant, preferences of a user learned by the virtual assistant, etc. What data is contained in trained model 304 may be determined by what type of model underlies the virtual assistant (e.g., weights of nodes in a neural network are not needed for non-neural network virtual assistants).

In various examples, trained model 304 may include data on how to train the virtual assistant. For example, the virtual assistant may use an external source for training (e.g., part of a shared computing infrastructure). The external source may be identified in trained model 304.

Data references 306 may identify what data has been used to train the virtual assistant and the logical location of the data. For example, as a virtual assistant is trained using data collected data collection component 122, the location of the data point 210 is maintained by virtual assistant 300. Accordingly, when transferred, the location of the data as stored in data references 306 may transfer as well for use by virtual assistant at the new device (e.g., for training).

User device ID 308 may include an identifier of a device the virtual assistant is currently associated with. For example, user device ID 308 may correspond to an identifier of a device in user devices 220.

Parent/child information 310 and variants 312 may not be present in each virtual assistant 300. In various examples, a virtual assistant may be hierarchical in nature. For example, a user may have a "master" virtual assistant and then sub-virtual assistants for different devices (e.g., a car, a mobile device). Variants 312 may identify different versions of a virtual assistant that the user may have. For example, the user may have different personality versions of the virtual assistant (e.g., one for work communications and another for family). Variants may also be created when transferring to a new device with different computational capabilities as discussed previously. If a virtual assistant has parent/children or variants, their IDs may be stored in parent/child information 310 and variants 312, respectively.

Parent/child information 310 and variants 312 may be used during a transfer to inform the user of possible side effects of a transfer. For example, if a parent virtual assistant is being transferred to a new device, transfer component 112 may transmit a request to the user to transfer the sub-virtual assistants. In other examples, the sub-virtual assistants may be transferred automatically. A similar process may be applied for variant virtual assistants.

Figure 4:
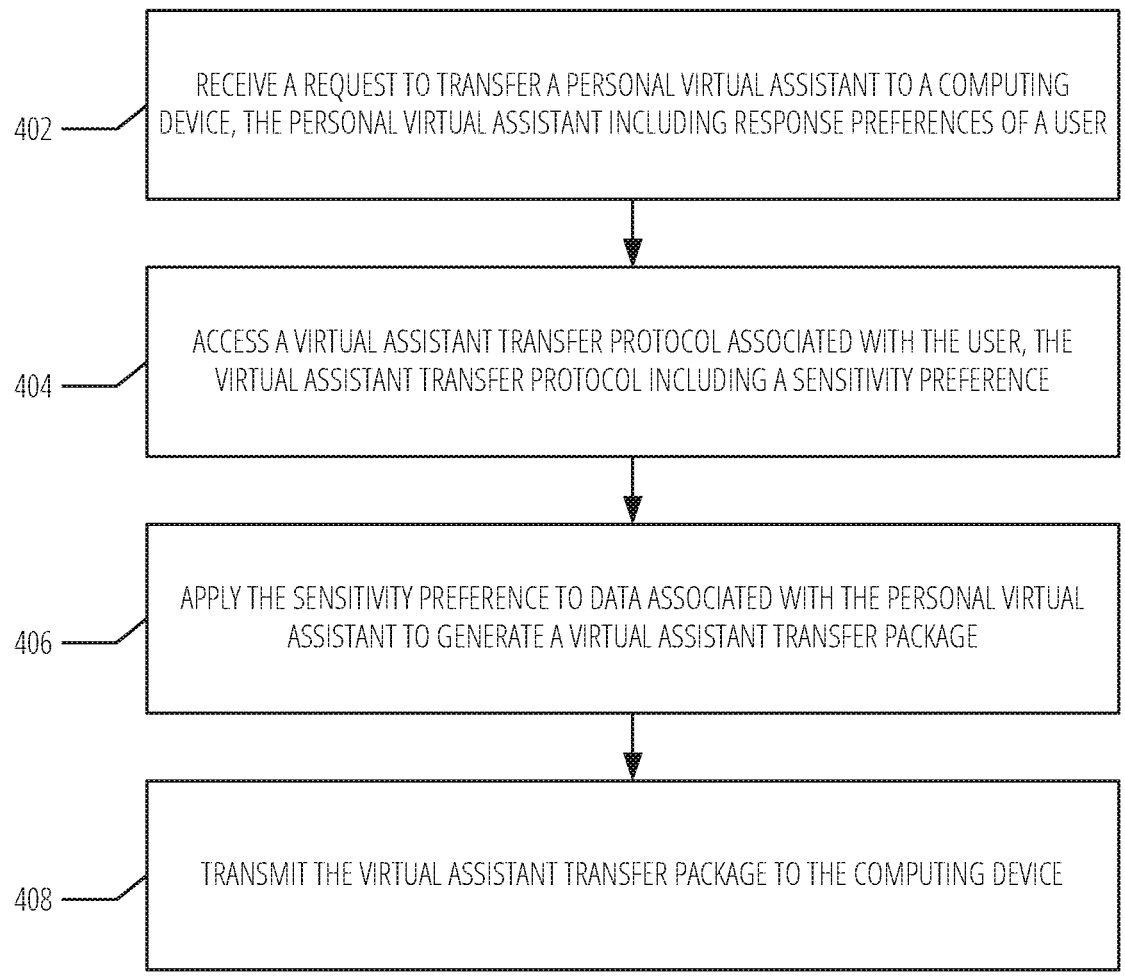
FIG. 4 is a flowchart illustrating a method to transfer a virtual assistant from one device to another, according to various examples.

FIG. 4 is a flowchart illustrating a method to transfer a virtual assistant from one device to another, according to various examples. The method is represented as a set of blocks that describe operations 402-408 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 4. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure. In various examples, the components of VAMS 102 performs the operations.

Operation 402, in various examples, includes receiving a request to transfer a virtual assistant to a computing device, the personal (e.g., a virtual assistant trained in part based on user data) virtual assistant including response preferences of a user. The request may be received at a system such as VAMS 102. The request may be in the form of a user activating a user interface element when viewing a list of the user's current virtual assistant(s).

The response preferences may include explicit preferences such as when the virtual assistant is asked "what address should I use" the virtual assistant knows to pick the user's home address, or implicit preferences that have been learned based on user data. In various examples, the response preferences may be stored as weights in a neural network, in various examples. In various examples, the response preferences include what sentiment to use. The response preferences may be stored as part of the model of the virtual assistant.

In various examples, it may be determined whether or not a conversation is active with the personal virtual assistant at a time of the request. For example, when the request is received, an API call may be transmitted to the virtual assistant to request its current conversation status. If it is determined that the virtual assistant is currently in conversation, an API call may be transmitted to terminate the conversation.

In various examples, the computing device may be a first computing device. Prior to receiving the request, the virtual assistant may be associated with a second computing device. For example, in a data store such as user profile 208, there may be an association between the second computing device and the virtual assistant. After transmitting the virtual assistant transfer package to the first computing device in operation 408, the association between the virtual assistant and the second computing device may be removed, and an association between the virtual assistant and the first computing device added.

In various examples, a computational complexity score of the virtual assistant may be retrieved. For example, the score may be retrieved from a data store such as virtual assistants 116—and the entry for the virtual assistant may be accessed. The score may be based on the processing power needed to train or use the virtual assistant. A warning may be presented to the user based on the score and a type of the computing device. For example, different types of devices may have different computing performance capabilities (e.g., a watch vs a tablet). A watch may have a score of '2' and if the computational complexity score is above a '2', a warning may be presented if the user is attempting to transfer the virtual assistant to the watch that the virtual assistant may perform sub-optimally on the new device.

In various examples, in addition to the warning, a variant of the virtual assistant may be generated based on the computational complexity score of the computing device. For example, a neural network with a reduction in layers or nodes per layer may be generated before the virtual assistant is transmitted to the computing device.

Operation 404, in various examples, includes accessing a virtual assistant transfer protocol associated with the user, the virtual assistant transfer protocol including a sensitivity preference. The sensitivity preference may be based on user preferences or data source restrictions in various examples.

Operation 406, in various examples, includes applying the sensitivity preference to data associated with the personal virtual assistant to generate a virtual assistant transfer package. The virtual assistant transfer package may include some or all of the data depicted in virtual assistant 300.

For example, the data associated with the personal virtual assistant may include training data previously used to train the personal virtual assistant. Applying the sensitivity preference may include blocking inclusion of an item of the training data from the virtual assistant transfer package. For example, the portability rating 224 of each data item may be checked (e.g., compared to a threshold) to see if the data (or reference to the data) may be included in a transfer.

In various examples, the data associated with the personal virtual assistant includes personally identifiable information of the user. Applying the sensitivity preference may include filtering out the personally identifiable information from the data. Thus, a modified version of the data may be transmitted.

In various examples, some of the data in virtual assistant 300 may be transmitted, while only indications that to the other data exists is sent to the second computing device. For example, some of the information may be not transmitted for compliance reasons but may still be of future use to the virtual assistant. For example, account activity information may not be transferred, but may be identified as information that may be useful to the virtual assistant. If the reasons for non-transference are obviated (e.g., a rule change) the information may then be transmitted for use by the virtual assistant.

Operation 408, in various examples, includes transmitting the virtual assistant transfer package to the computing device. The virtual assistant transfer package may include one or more of a location of where to download the virtual assistant, the virtual assistant itself, how to train the virtual assistant (e.g., what type of model, what API, etc.), the location of the data to train, response preferences of the user, etc.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules; which operate to perform the methodologies described herein.

Figure 5:
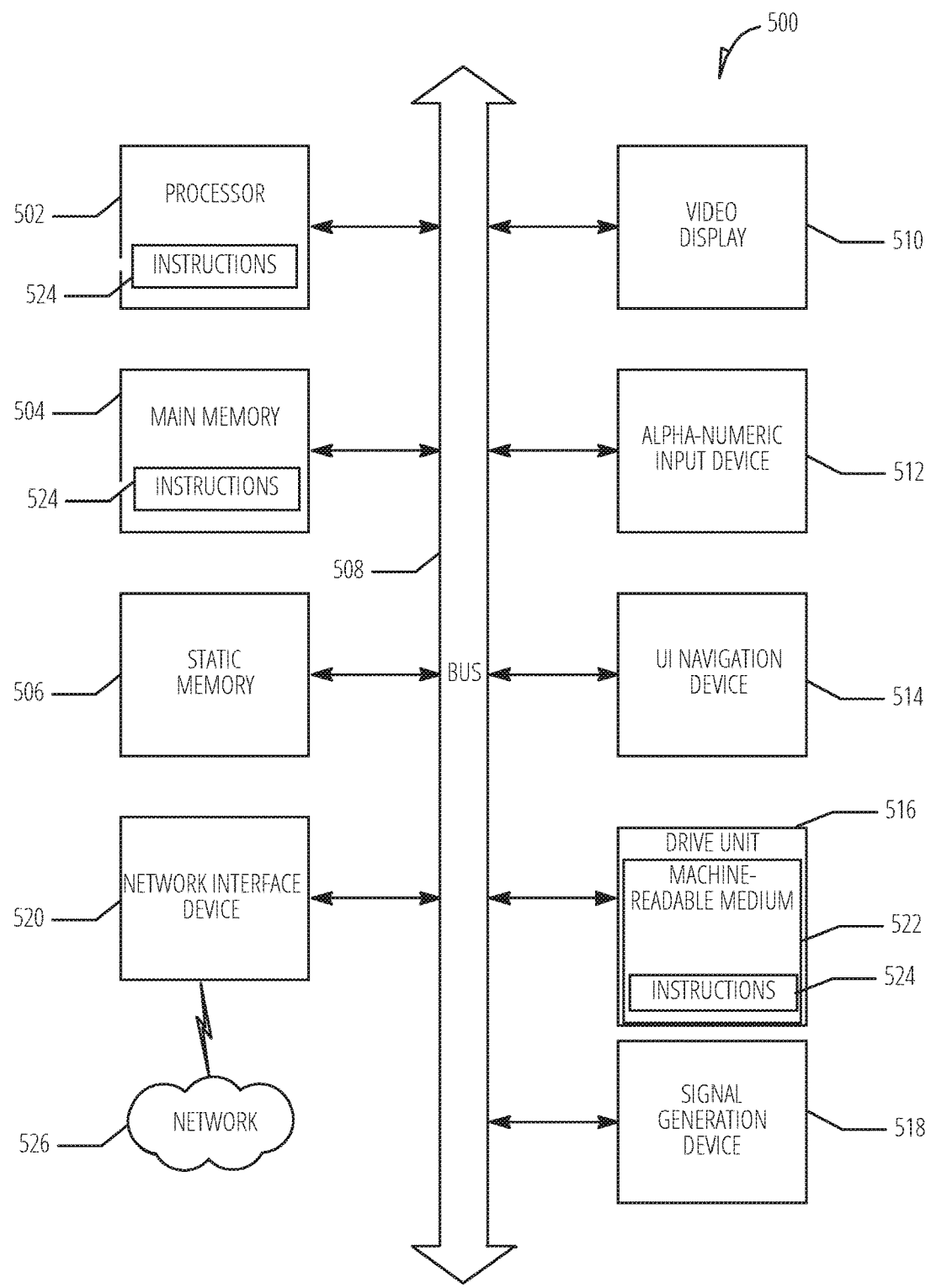
FIG. 5 is a block diagram illustrating an example machine upon which any one or more of the techniques (e.g., methodologies) discussed herein may be performed, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A, 5G, or WiMAX networks), The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show; by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
receiving a request to transfer a personal virtual assistant to a computing device, the personal virtual assistant including response preferences for the personal virtual assistant;
accessing a virtual assistant transfer protocol associated with a user, the virtual assistant transfer protocol defining rules on what data associated with the personal virtual assistant is to be transferred;
applying the rules to the data associated with the personal virtual assistant to generate a virtual assistant transfer package; and
transmitting the virtual assistant transfer package to the computing device.

2. The method of claim 1, wherein a rule of the rules on what data associated with the personal virtual assistant may be transferred includes a portability threshold.

3. The method of claim 2, wherein data points in the data associated with the personal virtual assistant include respective portability ratings and wherein applying the rules to the data associated with the personal virtual assistant to generate the virtual assistant transfer package includes:
including a data point of the data points in the virtual assistant transfer package when a portability rating of the data point exceeds the portability threshold.

4. The method of claim 3, wherein the portability rating of the data point is based on a plurality of factors and a first factor of the plurality of factors is a size of content associated with the data point.

5. The method of claim 4, wherein a second factor of the plurality of factors is a sensitivity preference with respect to the content.

6. The method of claim 1, further comprising:
transmitting a command to the computing device to remove a prior existing personal virtual assistant from the computing device.

7. The method of claim 1, further comprising:
generating a pruned variant of the personal virtual assistant optimized for a computational power of the computing device.

8. A system comprising: at least one processor; and a storage device comprising instructions, which when executed by the at least one processor, configure the at least one processor to perform operations comprising:
receiving a request to transfer a personal virtual assistant to a computing device, the personal virtual assistant including response preferences for the personal virtual assistant;
accessing a virtual assistant transfer protocol associated with a user, the virtual assistant transfer protocol defining rules on what data associated with the personal virtual assistant is to be transferred;
applying the rules to the data associated with the personal virtual assistant to generate a virtual assistant transfer package; and
transmitting the virtual assistant transfer package to the computing device.

9. The system of claim 8, wherein a rule of the rules on what data associated with the personal virtual assistant may be transferred includes a portability threshold.

10. The system of claim 9, wherein data points in the data associated with the personal virtual assistant include respective portability ratings and wherein applying the rules to the data associated with the personal virtual assistant to generate the virtual assistant transfer package includes:
including a data point of the data points in the virtual assistant transfer package when a portability rating of the data point exceeds the portability threshold.

11. The system of claim 10, wherein the portability rating of the data point is based on a plurality of factors and a first factor of the plurality of factors is a size of content associated with the data point.

12. The system of claim 11, wherein a second factor of the plurality of factors is a sensitivity preference with respect to the content.

13. The system of claim 8, wherein the instructions further configure the at least one processor to perform operations comprising:
transmitting a command to the computing device to remove a prior existing personal virtual assistant from the computing device.

14. The system of claim 8, wherein the instructions further configure the at least one processor to perform operations comprising:
generating a pruned variant of the personal virtual assistant optimized for a computational power of the computing device.

15. A non-transitory computer-readable medium comprising instructions, which when executed by at least one processor, configure the at least one processor to perform operations comprising:
receiving a request to transfer a personal virtual assistant to a computing device, the personal virtual assistant including response preferences for the personal virtual assistant;
accessing a virtual assistant transfer protocol associated with a user, the virtual assistant transfer protocol defining rules on what data associated with the personal virtual assistant is to be transferred;
applying the rules to the data associated with the personal virtual assistant to generate a virtual assistant transfer package; and
transmitting the virtual assistant transfer package to the computing device.

16. The non-transitory computer-readable medium of claim 15, wherein a rule of the rules on what data associated with the personal virtual assistant may be transferred includes a portability threshold.

17. The non-transitory computer-readable medium of claim 16, wherein data points in the data associated with the personal virtual assistant include respective portability ratings and wherein applying the rules to the data associated with the personal virtual assistant to generate the virtual assistant transfer package includes:
including a data point of the data points in the virtual assistant transfer package when a portability rating of the data point exceeds the portability threshold.

18. The non-transitory computer-readable medium of claim 17, wherein the portability rating of the data point is based on a plurality of factors and a first factor of the plurality of factors is a size of content associated with the data point.

19. The non-transitory computer-readable medium of claim 18, wherein a second factor of the plurality of factors is a sensitivity preference with respect to the content.

20. The non-transitory computer-readable medium of claim 15, wherein the operations further include:

transmitting a command to the computing device to remove a prior existing personal virtual assistant from the computing device.

\* \* \* \* \*

UNITED STATES PATENT AND TRADEMARK OFFICE
CERTIFICATE OF CORRECTION

| | |
|---|---|
| PATENT NO. | : 11,561,804 B1 |
| APPLICATION NO. | : 17/450352 |
| DATED | : January 24, 2023 |
| INVENTOR(S) | : Kushner et al. |

It is certified that error appears in the above-identified patent and that said Letters Patent is hereby corrected as shown below:

On the Title Page

In item (57), in "Abstract", in Column 2, Line 5, delete "user;" and insert --user,-- therefor Signed and Sealed this
Twenty-fifth Day of April, 2023

Katherine Kelly Vidal
*Director of the United States Patent and Trademark Office*